United States Patent [19]

Campagne et al.

[11] 4,395,429

[45] Jul. 26, 1983

[54] EXPANDABLE FOOD COMPOSITION

[75] Inventors: Jean-Claude Campagne; Guy Frappier, both of Melle, France

[73] Assignee: Rhone-Poulenc Industries, Paris, France

[21] Appl. No.: 246,158

[22] Filed: Mar. 23, 1981

[30] Foreign Application Priority Data

Mar. 21, 1980 [FR] France ............................... 80 06305

[51] Int. Cl.³ .......................... A23J 3/02; A23G 9/04; A23C 9/154
[52] U.S. Cl. .................................. 426/271; 426/564; 426/565; 426/569; 426/570; 426/571; 426/573; 426/578; 426/579; 426/584; 426/657
[58] Field of Search .............. 426/564, 565, 566, 567, 426/569, 570, 571, 572, 657, 578, 579, 584, 271

[56] References Cited

U.S. PATENT DOCUMENTS

| | | | |
|---|---|---|---|
| 2,233,178 | 2/1941 | Otting et al. | 426/565 |
| 2,307,234 | 1/1943 | Otting et al. | 426/565 |
| 3,407,076 | 10/1968 | Ganz | 426/570 |
| 3,535,122 | 10/1970 | Mussellwhite et al. | 426/565 |
| 3,615,661 | 10/1971 | Ellinger et al. | 426/565 |
| 3,721,571 | 3/1973 | Glicksman | 426/573 |
| 3,784,712 | 1/1974 | Glicksman | 426/573 |
| 3,809,764 | 5/1974 | Gabby et al. | 426/565 |
| 4,089,987 | 5/1978 | Chang | 426/564 |
| 4,100,149 | 7/1978 | Meiller et al. | 260/112 R |
| 4,229,342 | 10/1980 | Mirabel | 426/656 |

FOREIGN PATENT DOCUMENTS

| | | | |
|---|---|---|---|
| 7054 | 1/1980 | European Pat. Off. | |
| 2119365 | 12/1971 | France | 426/573 |
| 2399214 | 5/1977 | France | 426/656 |
| 2452881 | 4/1979 | France | 260/112 R |

OTHER PUBLICATIONS

Mirabel, *Ann. Nutr. Alim.*, vol. 32, No. 2–3, 1978, pp. 243–253.

*Primary Examiner*—Jeanette M. Hunter
*Attorney, Agent, or Firm*—Burns, Doane, Swecker & Mathis

[57] ABSTRACT

A storage-stable food composition, expandable with either milk or water, even at acidic pH, into an organoleptic/nutritional edible food substrate, is comprised of (i) a successive anion exchange resin/silica or silica/anion exchange resin extracted lactoserum protein fraction, and (ii) a Xanthomonas hydrophilic colloid.

29 Claims, No Drawings

EXPANDABLE FOOD COMPOSITION

BACKGROUND OF THE INVENTION

1. Field of the Invention

The present invention relates to expandable food substrates, edible compositions and instant dessert preparations, as well as to the preparation of various confections therefrom, and, more especially, relates to those expandable foodstuff formulations and powdered substrates destined for the making of instant desserts therefrom, particularly those to be constituted from liquid milk.

2. Description of the Prior Art

It has long been a desideratum to this art to prepare a food product in the form of a mousse, wherein both milk and acidic fruit juices would be present together. Such a product would have desirable dietetic properties. There are, however, certain inherent difficulties which arise when attempts are made to combine milk, which has a tendency to curdle, with an acidic agent. Another problem is the fact that in order to provide good organoleptic properties and to be accepted by consumers, the mousse must satisfy rather specific density requirements, typically between 0.3 and 0.45. A ligher mousse gives the sensation of "emptiness", while an excessively dense mousse likely is considered "too heavy" or too liquid. Finally, the resultant mousse must display the quality of durability.

And even though certain "instant" preparations for the confection of a mousse or other ready made dessert, whether frozen or unfrozen, are already commercially available, the same are not entirely satisfactory.

These preparations, called mixes, are characteristically in the form of a powder and it is only necessary to simply mix them with cold milk, the expansion or constitution thereof being effected by beating with a mechanical whisp.

Typically, the recipe for such mixes comprises the following: sugar, sucrose; a fatty material, most frequently of vegetable origin, e.g., soybean oil, corn oil, coconut oil, cottonseed oil, peanut oil, sunflower oil, and the like; one or more food emulsifiers, such as, for example, the mono- and diglycerides of fatty acids or their esters, sodium 2-stearoyllactyllactate, polyoxyethylene sorbitan stearates and oleates, etc.; thickeners which most frequently consist of alginates or carragheenates; and various perfumes, aromas or scents, and colorants.

The inclusion of an emulsifier and of fatty material in a powder preparation of course mandates the conversion of such ingredients to powder form, with the most conventional method consisting of the spray-drying or atomization of an homogenized aqueous emulsion of a mixture of the emulsifier and the fatty material and either sodium caseinate or milk. Such base substrates or preparations, which shall hereinafter be designated the expandable bases are readily commercially available, thus enabling the manufacturer of the aforenoted food mixes to formulate same simply by mixing together the various commercially available powders, and hence facilely preparing any one of a number of instant food products.

But the use of an expandable base consisting of the emulsifier and the fatty material, on a proteinaceous milk substrate (sodium caseinate or milk) gives rise to a number of marked disadvantages. For example, it has been determined that the capacity of the base to expand declines with time. Furthermore, the base expands poorly in an acid pH, during the preparation of a mousse constituted from milk or water. This is a significant disadvantage, because no preparations comprising acid perfumes or aromas may be made (red fruit or lemon, for example), certain of such aromas being poorly compatible with milk.

SUMMARY OF THE INVENTION

Accordingly, a major object of the present invention is the provision of an improved expandable food composition that may be formulated with water or milk, even at an acid pH, and which otherwise avoids those disadvantages and drawbacks to date characterizing this art.

Another object of the invention is to provide a confection in the form of a mousse having a highly agreeable taste, and itself displaying good organoleptic and nutritional properties.

Yet another object of the present invention is to provide an expandable food composition containing neither an emulsifier nor fatty material.

Still another object of the invention is to provide a confection having a high degree of stability, manifested in particular by resistance to syneresis upon aging.

Briefly, the above and other objects of this invention are attained by providing an improved expandable food composition comprising (i) those lactoserum proteins extracted via extraction process utilizing Spherosil ion exchanger, and (ii) an Xanthomonas hydrophilic colloid.

By "lactoserum" proteins as intended herein, there are included the lactalbumins, seralbumin, lactoglobulin and the immunoglobulins.

DETAILED DESCRIPTION OF THE INVENTION

More particularly according to this invention, the lactoserum proteins comprising the subject compositions are obtained by means of extraction processes utilizing those selective absorbants commercially marketed under the trademark "Spherosil" ion-exchangers. Such processes are described in French Pat. No. 2,321,932 (Application No. 75/26,530) and Certificate of Addition No. 2,359,633 thereto (Application No. 76/22,985); more preferably, the subject compositions are comprised of those lactoserum proteins obtained by the process described in Certificate of Addition No. 2,399,214 (Application No. 77/24,162).

The immediately aforesaid processes for the extraction of lactoserum proteins are characterized by successively contacting the lactoserum with at least one anion exchange resin and then with silica, or successively with silica and then with at least one anion exchange resin, next by fixation of said proteins, and finally by elution.

The anion exchange resins are advantageously comprised of supports of alumina or silica, coated with less than $20/mgm^2$ of a cross-linked polymer film, comprising or bearing tertiary amine functional groups or quaternary ammonium salts having the general formulae:

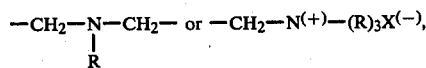

wherein each R, which may be identical or different, represents an alkyl or hydroxyalkyl radical having 1 to 4 carbon atoms and X is a mineral or organic anion, such as, for example, chloride, sulfate, nitrate, phosphate, citrate, and the like.

The silica and the supports for the anion exchange resins have grain sizes between 4 μm and 5 mm, a specific surface on the order of 5 to 150 m²/g, a pore volume of 0.4 to 2 cm³/g and a pore diameter between 250 and 2500 Å.

The cross-linked polymers which coat the surface of the supports are per se known to this art, being obtained from monomers, such as epoxy compounds, which cross-link with polyamines as the catalysts; formaldehyde which cross-links by polycondensation with urea, melamine, polyamines or phenols; vinyl monomers, e.g., vinylpyridine, styrene and derivatives thereof, which cross-link with polyfunctional monomers, such as the diacrylates or dimethacrylates of mono- or polyalkylene glycols, divinylbenzene, vinyltrialkoxysilane, vinyltrihalogenosilane, methylene-bis-acrylamide, in the presence of an initiator or ultraviolet radiation.

The contacting of the lactoserum with the anion exchange resin or resins is advantageously effected at a pH of greater than 4 and preferably between 5.5 and 7.5, and at temperatures between 0° and 50° C., preferably between 0° and 30° C.

The amount of the anion exchange resin or resins is on the order of 5 to 15 grams per gram of the total amount of proteins to be extracted and the amount of silica is on the order of 2 to 7 grams per gram of the total amount of proteins to be extracted.

The proteins extracted by the anion exchange resins are the β-lactoglobulins, α-lactalbumins, seralbumin and a slight fraction of the immunoglobulins. The silica extracts the major fraction of the immunoglobulin.

The separation of the proteins from the resin or resins, and the silica, is effected by elution with a solution of high ionic strength, or with an acidic pH solution for the anion exchange resin(s) and basic for the silica.

The proteins obtained in this fashion are in a highly purified state and have the characteristic that they have not been denatured during extraction.

And such proteins are very high in purity, typically at least 90% pure. To determine protein purity, nitrogen analysis is effected by the Kjeldahl method, after which the protein purity is calculated by multiplying the nitrogen content, expressed as a percentage of the weight of dry product, by a factor of 6.32.

Said proteins contain only traces (<0.5%) of fats, and of the lactose and sugar which is difficult to assimilate; same are also high in nutritional value.

The Xanthomonas hydrophilic colloid employed in the invention is a polysaccharide obtained by the fermentation of a carbohydrate under the action of bacteria of the genus Xanthomonas. Said colloid is an exocellular substance of high molecular weight, preferably in excess of one million.

Representative species of bacteria that may be utilized in the production of the subject colloids are: Xanthomonas, Begoniae, Xanthomonas Campestris, Xanthomonas Carotea, Xanthomonas Hederae, Xanthomonas Incanae, Xanthomonas Malvacearum, Xanthomonas Phaseoli, Xanthomonas Vitians.

In a preferred embodiment of the present invention the hydrophilic colloid is that produced by the bacteria of the species *Xanthomonas campestris*.

It is possible to ferment a variety of carbohydrates with the aforenoted microorganisms to produce the Xanthomonas colloid for the compositions according to the invention. Exemplary carbohydrates which are suitable include glucose, sucrose, fructose, maltose, lactose, starch hydrolysates, corn starch, potato starch, etc. The carbohydrate fermentation is typically effected in an aqueous medium including up to 60/1 glucide. It is also known that the fermentation medium may additionally contain a source of phosphorus, a source of magnesium which is an enzyme activator, and a source of nitrogen, typically consisting of "distillery solubles" (U.S. Pat. No. 3,000,790), bran, whole grain cereals, such as sorghum, soybeans or corn (U.S. Pat. No. 3,271,267), "corn steep" (U.S. Pat. No. 3,355,447) or inorganic nitrogen compounds, such as ammonium nitrate (published French Application No. 76/05,933).

It may also be advantageous to subject the fermented mash to heat treatment at a temperature ranging from 80° to 130° for from about 10 minutes to about 1 hour.

The Xanthomonas colloid is isolated from the fermentation mash and is typically used in the form of a powder.

The separation of the Xanthomonas colloid from the mash, optionally preliminarily heated as indicated hereinabove, may be effected by conventional methods, for example, via precipitation by addition to said mash of a lower alcohol, such as methanol, ethanol, isopropanol, tertiary butanol, or acetone, or a mixture of such precipitating agents. Once precipitated, the Xanthomonas colloid is separated, washed with the liquid of precipitation, then dried and ground.

The Xanthomonas colloid obtained may be subjected to additional purifications: for this purpose, methods known to the prior art may be used, consisting, for example, of subjecting the fermented mash, or the aqueous gel reconstituted from the Xanthomonas colloid extracted from the mash, to centrifugation or filtration on diatomaceous earths, to the action of protease type enzymes (French Pat. No. 2,264,077), or to sodium hydroxide (U.S. Pat. No. 3,729,460).

Preferably, the colloid obtained by fermentation of a carbohydrate with a pure culture of *Xanthomonas campestris* is used; said colloid being extracted with isopropanol, dried and ground. This colloid shall hereinafter simply be designated as "Xanthane gum".

Same, moreover, displays rather remarkable properties, specifically an essentially constant viscosity over a broad pH range. It is also soluble in the cold state. And, it too has good compatibility with a large number of products, over a wide range of concentrations.

The respective amounts of the lactoserum proteins and the Xanthomonas hydrophilic colloid comprising the expandable food compositions according to the invention may be varied as a function of the particular properties of the mousse that one desires to obtain. Typically, however, it has been determined that a composition which suffices for the preparation of confections comprises the lactoserum proteins and an Xanthomonas colloid in a weight ratio varying from 5 to 15%, preferably from 7 to 12%.

The expandable food compositions according to the invention not only are well suited for processing into dessert products, but are also useful in the preparation of salty side dishes consistent herewith.

The confectionary formulations may take different forms. For example, such preparations may consist of a powder for instant confections, i.e., one obtained by simple addition of a liquid, milk or water, without the need for heating, or liquid preparations in cans, which may be expanded or foamed without any additions whatsoever prior to consumption, or frozen expanded preparations ready for immediate consumption. In this case, the ingredients of such products are necessarily no longer in the powder form.

The other ingredients of such preparations, combined with the expandable food compositions according to the invention, are conventional to this type of food product, such as other colloids, chemically unmodified starches, edible phosphates, and, optionally, sweeteners, acidifying agents, flavoring agents, and the like.

Exemplary of those "other" colloids suitable for combination with the topic hydrophilic Xanthomonas colloids, the following are representative: vegetable seed gums, such as carob seed gum, guar gum, algae gums, such as the alginates, agar-agar, carragheenates, sodium carboxymethylcellulose, pectin; such colloids, moreover, can be used either singly or any admixture.

Preferably, colloids such as the carragheenates of the kappa, lambda, iota type and/or alginates, particularly sodium alginate, are employed. Colloids of vegetable origin are widely described in the literature [e.g., KIRK-OTHMER, "Encyclopedia of Chemical Technology", 17, pp. 768–781 (1968)] and are readily commercially available.

The chemically unmodified starches may consist of raw starches or physically modified starches (for example, pregelatinized). In powder preparations for the preparation of confections without heating, preferably a pregelatinized starch having the property to swell in the cold state, is used. As examples of chemically unmodified food starches that are useful consistent with the present invention, the following are mentioned: corn starch, potato starch, tapioca starch, rice starch, wheat starch. Corn starch is most frequently used.

Edible phosphates are used as stabilizers in food products containing large amounts of proteins. Orthophosphates, such as sodium or potassium mono- or diphosphate; pyrophosphates, such as tetrasodium or tetrapotassium pyrophosphate, are noted; the latter are the most typical.

The sweetening agents that may be included in the preparations for confections comprise sucrose, dextrose (glucose), fructose, dextrins and related glucides. Low calorie confections may be prepared as well by using sorbitol, mannitol or xylitol, or synthetic sweetening agents, such as saccharin, an alkali metal or alkaline earth metal salt of saccharin, or a peptide, such as the methyl ester of L-aspartyl-L-phenylalanine.

Acidic agents may also be employed in light of the fact that the expandable food compositions of the invention are stable in an acid pH. The acidifying agent may be an acid of food quality or grade, such as, for example, citric acid, tartaric acid, fumaric acid, either in anhydrous or hydrated state, or in an admixture of such acids. Acetic or lactic acid may also be included, if the preparation is in a form other than a powder.

In addition to the aforenoted components, conventional ingredients to color and flavor the preparations of the invention may also be incorporated, particularly those based on milk. Similarly, conventional flavoring agents, such as cacao, vanilla, cinnamon and the like, or fruit extracts: raspberry, cherry, strawberry, peach, lemon, orange, grapefruit, etc.

It will of course be appreciated that the foregoing lists of ingredients include but representative such ingredients, and are not to be construed as limitative.

Typical compositions of confectionary preparations generally in the powder form, to which either milk or water is added, are characterized hereinbelow for purposes of illustration (percentages are expressed by weight):

| (i) | Lactoserum proteins | 5 to 20% |
|---|---|---|
| (ii) | Hydrophilic Xanthomonas colloid | 0.5 to 1.5% |
| (iii) | Chemically unmodified starch | 5 to 20% |
| (iv) | Edible phosphate | 0.5 to 1.5% |
| (v) | Sweetening agent | 50 to 90% |
| | Preferred proportions are the following: | |
| (i) | Lactoserum proteins | 8 to 15% |
| (ii) | Hydrophilic Xanthomonas colloid | 0.8 to 1.2% |
| (iii) | Chemically unmodified starch | 8 to 15% |
| (iv) | Edible phosphate | 0.5 to 1% |
| (v) | Sweetening agent | 60 to 80% |

In that event case where an admixture of colloids is used, i.e., when the hydrophilic Xanthomonas colloid is combined, for example, with a vegetable colloid, such as the carragheenates and/or sodium alginates, 0.5 to 1.5% by weight of same are advantageously incorporated.

Flavorants and colorants are optionally included in varying amounts, depending upon the type of, e.g., perfume selected.

If an acidifying agent is used, it should be present in such amounts that the pH of the product confection has a value greater than 2, preferably greater than 3.

The amount of the acidifying agent used is a function of its type and nature. For example, in the case of citric acid, a pH in the vicinity of 3.5 is obtained by using 0.7 to 1% of the acid with respect to the amount of water used to reconstitute the confection.

Exemplary, non-limiting preferred confections per this invention are now presented for illustrative purposes:

| PREPARATION A: | |
|---|---|
| (i) | Lactoserum proteins |
| (ii) | Xanthane gum |
| (iii) | Pregelatinized starch |
| (iv) | Sucrose |
| PREPARATION B: | |
| (i) | Lactoserum proteins |
| (ii) | Xanthane gum |
| (iii) | Sodium carragheenate and/or alginate |
| (iv) | Pregelatinized starch |
| (v) | Sucrose |
| PREPARATION C: | |
| (i) | Lactoserum proteins |
| (ii) | Xanthane gum |
| (iii) | Sodium carragheenate and/or alginate |
| (iv) | Pregelatinized starch |
| (v) | Sodium or potassium pyrophosphate |
| (vi) | Sucrose |
| PREPARATION D: | |
| (i) | Lactoserum proteins |
| (ii) | Xanthane gum |
| (iii) | Sodium carragheenate and/or alginate |
| (iv) | Pregelatinized starch |
| (v) | Sodium or potassium pyrophosphate |
| (vi) | Sucrose |
| (vii) | Citric acid |

In order to prepare a confection based on milk or water according to the invention, any one of the foregoing preparations, in powder form, is added to the liquid selected, which may be at ambient temperature or even much colder, for example, when refrigerated; its temperature may thus vary without disadvantage between, e.g., 5° and 25° C. Generally, approximately 100 g of the preparation are mixed with approximately 250 cm³ of milk or water. The expansion, or fluffing, or foaming, of the confection is effected by using, for example, a whisk or an egg beater, or an electric mixer or blender. The confection may be consumed as is, or it may be refrigerated or frozen, until removed from the refrigerator and then eaten.

When the liquid used to constitute the ultimate preparation is water, obviously potable water will be employed, which may either be tap water or a natural mineral water.

When constituting a milk-based confection utilizing any preparation according to the invention, both whole or skim liquid milk may be used, while the milk may be fresh, pasteurized or sterilized by the principle of "high temperature-short duration".

The milk, however, may be altogether replaced by adding whole or skim milk powder to the powder preparation, characteristically in a weight ratio of 20 to 30%. In this event, it suffices to add water and to beat the mixture in order to manipulate the composition into a mousse.

In order to further illustrate the present invention and the advantages thereof, the following specific examples and comparative examples are given, it being understood that same are intended only as illustrative and in nowise limitative.

In all of said examples to follow, the hydrophilic Xanthomonas colloid employed was that Xanthane food gum marketed by Rhone-Poulenc Co. under the trademark "Rhodigel 23", and having the following specifications:

| (i) | Purity | ≳91% |
|---|---|---|
| (ii) | Ash | 6.5 to 16% |
| (iii) | Drying loss | ≲15% |
| (iv) | Pyruvic acid | ≳1.5% |
| (v) | Arsenic | ≲3 ppm |
| (vi) | Heavy metals (in Pb) | ≲30 ppm |
| (vii) | Isopropyl alcohol | ≲750 ppm |
| (viii) | Lead | ≲5 ppm |

The lactoserum proteins employed per the invention were lactoserum proteins obtained on Spherosil ion-exchangers according to the process described in French Certificate of Addition No. 2,392,214 (Application No. 77/24,162).

Said proteins are extracted from lactoserum according to that process which consists of:

(a) percolating sweet lactoserum (ph 6.5) successively through a first anion exchange resin column comprising silica particulates coated with a cross-linked polymer film bearing —$N(CH_3)_3^+Cl^-$ functions (Spherosil QMA), then through a second column charged with silica having a grain size of 100 to 200 μm, a specific surface of 25 m²/g, an average pore diameter of 1000 Å and a pore volume of 0.8 cm³/g (Spherosil XOB 15);

(b) washing the resin and the silica in the two columns with water;

(c) eluting the first column with an N/100 solution of hydrochloric acid and the second column with an N/100 ammonia solution; and (d) lastly, again washing the two columns with water.

The lactoserum proteins thus obtained display the following characteristics:

| (i) | Nitrogen | 13% (90.3% protein purity) |
|---|---|---|
| (ii) | Carbon | 47% |
| (iii) | Ash | 2.5% |
| (iv) | Lactose | <0.5% |
| (v) | Fatty matter | <0.5% |
| (vi) | Water | 9% |
| (vii) | Lactate | <0.1% |
| (viii) | Mineral salts | 1.38% |

In order to evaluate the capacity to expand or fluff of any given composition, the following test was carried out:

The test was conducted on an expandable food composition (or base) combined with the "other" ingredients defined in the several experiments.

Thus, said test consisted of:

100 g of a subject expandable preparation, in powder form, were introduced into a mixing bowl and 250 cm³ of water or milk were added thereto; and the mixture was then beaten for 5 minutes with a beater equipped with those fine whisks normally used to beat egg whites (the speed of the beater was at its maximum).

The density of the resultant mousse was measured and its appearance and stability upon aging were evaluated.

In the following non-limiting examples, the properties of the expandable food compositions of the invention are also set forth. The preparations employed were neutral, and contained no flavoring agents, perfumes or colorants.

EXAMPLES 1 to 4

The following expandable food composition was formulated:

| (i) | Lactoserum proteins | 15% |
|---|---|---|
| (ii) | Xanthane gum | 1% |
| (iii) | Carragheenate | 1% |
| (iv) | Pregelatinized corn starch | 12% |
| (v) | Sucrose | 71% |

In order to constitute a mousse therefrom, the following liquids were respectively added to 100 g of said mixture:

(1) In Example 1: 250 cm³ tap water;
(2) In Example 2: 250 cm³ whole milk U.H.T.;
(3) In Example 3: 250 cm³ tap water + 1 g citric acid monohydrate; and
(4) In Example 4: 250 cm³ whole milk U.H.T. + 1 g citric acid monohydrate.

The expansion or fluffing of the beginning composition was effected with a household beater, as described hereinabove.

The various results of the aforesaid tests are reported in Table I:

TABLE I

| EXAMPLES | 1 | 2 | 3 | 4 |
|---|---|---|---|---|
| Constituting liquid | water | milk | water + citric acid | milk + citric acid |
| pH | 3.9 | 4.8 | 3.2 | 4.3 |
| Density of mousse | 0.395 | 0.400 | 0.360 | 0.460 |
| Appearance | good | fine and | good | slightly |

TABLE I-continued

| EXAMPLES | 1 | 2 | 3 | 4 |
|---|---|---|---|---|
| | structure | creamy | structure | liquid |

EXAMPLES 5 to 10

In this series of examples, the influence of pH on density and appearance of the final product mousse were determined.

The following composition was formulated:

| (i) | Lactoserum proteins | 10% |
|---|---|---|
| (ii) | Xanthane gum | 0.8% |
| (iii) | Sodium alginate | 1% |
| (iv) | Pregelatinized corn starch | 8.2% |
| (v) | Tetrasodium pyrophosphate | 1% |
| (vi) | Sucrose | 79% |

In Examples 5 to 10, respectively, to 100 g of the preparation, amounts of citric acid increasing from 0 to 9 g were added to provide compositions having pH's ranging from 5.3 to 2.6.

Expansion or fluffing was carried out with 250 cm$^3$ tap water.

The results of such tests are reported in Table II:

TABLE II

| EXAMPLES | 5 | 6 | 7 | 8 | 9 | 10 |
|---|---|---|---|---|---|---|
| Citric acid (g) | 0 | 0.5 | 1 | 2 | 4 | 9 |
| pH | 5.3 | 4.45 | 4.2 | 3.7 | 3.2 | 2.6 |
| Density of mousse | 0.360 | 0.340 | 0.350 | 0.340 | 0.360 | 0.390 |
| Appearance | fine and firm mousse | | | | slightly less firm | |

It was thus determined that the variation in density of the mousse within the topic range of pH values was low.

EXAMPLE 11

The stability of the following expandable preparation, upon extended storage, was analyzed:

| (i) | Lactoserum proteins | 10% |
|---|---|---|
| (ii) | Xanthane gum | 0.8% |
| (iii) | Sodium alginate | 1% |
| (iv) | Pregelatinized corn starch | 8.2% |
| (v) | Tetrasodium pyrophosphate | 1% |
| (vi) | Sucrose | 79% |

The composition was stored at an ambient temperature of 22° C. and expansion thereof was tested on 100 g of said preparation mixed with 250 cm$^3$ tap water and 1 g citric acid monohydrate.

The results of such tests are reported on Table III:

TABLE III

| Age of the preparation | Time of production | 2 months later | 6 months later | 1 year later |
|---|---|---|---|---|
| pH | 4.2 | 4.2 | 4.25 | 4.2 |
| Density of the mousse | 0.350 | 0.340 | 0.345 | 0.350 |
| Appearance | Fine and firm mousse | | | |

Thus, but scant change was evident in the preparation upon prolonged storage.

A series of comparative experiments was then conducted to demonstrate the superiority of the expandable composition of the invention vis-a-vis an expandable base consisting of an emulsifier, fatty material and sodium caseinate.

EXPERIMENTS A TO F

In these experiments, the expandable base consisted of 10% lactic esters of mono- and diglycerides, 50% hydrogenated copra oil (melting point 30° C.) and 40% sodium caseinate.

The following preparation was formulated:

| (i) | Expandable base | 33% |
|---|---|---|
| (ii) | Sodium alginate | 0.75% |
| (iii) | Carragheenate | 0.75% |
| (iv) | Sucrose | 65.5% |

To 92 g of this powder mixture, 250 cm$^3$ whole U.H.T. milk at 5°-6° C. and increasing amounts of citric acid monohydrate were added; the expansion test was carried out under the above-described conditions.

The results of such test are reported in Table IV:

TABLE IV

| EXPERIMENTS | A | B | C | D | E | F |
|---|---|---|---|---|---|---|
| Citric acid (g) | 0 | 0.2 | 0.3 | 0.4 | 0.5 | 1 |
| pH | 6.7 | 6.05 | 5.9 | 5.6 | 5.5 | 4.5 |
| Density of mousse | 0.340 | 0.335 | 0.389 | 0.750 | 0.880 | 0.9 |
| Appearance | Firm mousse | | Coarser structure | | Liquid | |

It will be noted that a considerable drop in capacity for expansion can result with but very slight decrease in pH.

EXPERIMENTS G TO K

A series of experiments was carried out under the same conditions as the series of Experiments A to F, but by replacing the milk with tap water.

The results of these particular tests are reported in Table V:

TABLE V

| EXPERIMENTS | G | H | I | J | K |
|---|---|---|---|---|---|
| Citric acid (g) | 0 | 0.05 | 0.1 | 0.15 | 0.2 |
| pH | 7.4 | 6.5 | 6.1 | 5.35 | 5.2 |
| Density of mousse | 0.320 | 0.370 | 0.385 | 0.630 | 0.875 |
| Appearance | Firm mousse | Lack of firmness | Rather liquid | Liquid | |

Analysis of the results compiled in Tables II to V clearly reflects the superior properties of the expandable food compositions of the invention, as the expandable base product having an acid pH exhibits poor capacity for expansion and there results a large variation in the density of the mousse over a range of acid pH values, which nevertheless are less acid than in Examples 5 to 10.

EXPERIMENT L

In this experiment, the stability of the preparation employed in the preceding Experiments A to K was evaluated upon prolonged storage.

The preparation was stored at an ambient temperature of 22° C. and the expansion test was carried out rising 250 cm$^3$ semi-skim U.H.T. milk.

The results of such tests are reported in Table VI:

TABLE VI

| Age of base | Upon receipt | 1 month later | 6 months later | 1 year later | 2 years later |
|---|---|---|---|---|---|
| Density of mousse | 0.320 | 0.340 | 0.380 | 0.440 | 0.490 |
| Appearance | Firm mousse | | Mousse rather firm | | Slightly liquid |

A decrease in the capacity for expansion of the expandable base as a function of time has accordingly been demonstrated. This reduction in capacity for expansion may be due to a modification in structure or to oxidation of the fatty phase consisting of the emulsifier and the fatty material.

Three (3) series of experiments were next carried out by varying the nature of the protein component:

EXAMPLES 12 to 15

Experiments M to T

Three milk proteins obtained by different techniques were compared:

(a) Lactoserum proteins obtained on Spherosil ionexchanger having the hereinbefore characterized properties;

(b) Lactoserum proteins extracted by an ultrafiltration process and having the following composition:

| | | |
|---|---|---|
| (i) | Proteins | 60% |
| (ii) | Lactose | 30% |
| (iii) | Fatty matter | 3% |
| (iv) | Mineral salts | 7% |

(c) Sodium caseinate.
The following composition was formulated:

| | | |
|---|---|---|
| (i) | Proteins (a, b or c) | 9% |
| (ii) | Xanthane gum | 0.7% |
| (iii) | Carragheenate | 0.7% |
| (iv) | Pregelatinized corn starch | 10% |
| (V) | Tetrasodium pyrophosphate | 0.6% |
| (vi) | Sucrose | 79% |

Expansion tests were carried out as hereinabove, each utilizing 100 g of such composition.

To constitute the mousse, the following liquids were added to the compositions at ambient temperature:

(1) In Example 12 and Experiments M and Q: 250 cm³ semi-skim milk, U.H.T.;

(2) In Example 13 and Experiments N and R: 250 cm³ tap water;

(3) In Example 14 and Experiments O and S: 250 cm³ tap water + 1 g citric acid monohydrate; and (4) In Example 14 and Experiments P and T: 250 cm³ tap water + 2 g citric acid monohydrate.

The results of such tests are reported in Table VII:

TABLE VII (a) Lactoserum proteins:

| EXAMPLES | 12 | 13 | 14 | 15 |
|---|---|---|---|---|
| Constituting liquid | milk | water | water + citric (1 g) | water + citric acid (2 g) |
| pH | 5.3 | 5.1 | 3.9 | 3.5 |
| Density of mousse | 0.320 | 0.355 | 0.310 | 0.320 |
| Appearance | Fine and creamy mousse | Fine and firm mousse | Fine mousse | |

(b) Ultrafiltered lactoserum proteins:

| EXPERIMENTS | M | N | O | P |
|---|---|---|---|---|
| Constituting liquid | milk | water | water + citric acid (1 g) | water + citric acid (2 g) |
| pH | 6.8 | 7.6 | 5.1 | 4.2 |
| Density of mousse | 0.490 | 0.860 | 0.615 | 0.810 |
| Appearance | | Liquid | | Coarse and unstable mousse |

(c) Sodium caseinate:

| EXPERIMENTS | Q | R | S | T |
|---|---|---|---|---|
| Constituting liquid | milk | water | water + citric acid (1 g) | water + citric acid (2 g) |
| pH | 7 | 7.9 | 5.5 | 4.5 |
| Density of mousse | 0.390 | 0.295 | 0.550 | 0.980 |
| Appearance | Fine, creamy mousse, slightly thready | Fine and firm mousse | | Liquid |

It is thus apparent that the nature and purity of the lactoserum proteins are also important in accordance with this invention.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A storage-stable composition of matter comprising: (i) a purified, undenatured lactoserum protein fraction obtained by extracting lactoserum first with at least one anion exchange resion and then with silica, or by extracting lactoserum first with silica and then with at least one anion exchange resin, the lactoserum being contacted with said anion exchange resin at a pH between about 4 and about 7.5 and at a temperature between about 0° and about 50° C., whereby protein becomes fixed to said anion exchange resin and to the silica, and then eluting the fixed protein from the anion exchange resin and from the silica, said anion exchange resin comprising a support of alumina or silica, coated with less than 20 mg/m² of a cross-linked polymer film bearing tertiary amine functional groups or quarternary ammonium salts having the general formulae

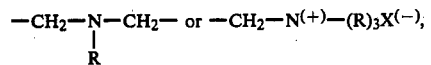

wherein each R, which may be identical or different, represents an alkyl or hydroxyalkyl radical having 1 to 4 carbon atoms and X is a mineral or organic anion, said silica and said support having a grain size between about 4 μm and 5 mm, a specific surface of about 5 to 150 m²/g, a pore volume of about 0.4 to 2 cm³/g and a pore diameter between about 250 and 2500 Å; and (ii) a Xanthomonas hydrophilic colloid; sufficient amounts of (i) and (ii) being present such that said composition is capable of being whipped to form a stable edible food substrate.

2. The composition of mattter as defined by claim 1, said lactoserum protein fraction comprising lactalbumins, seralbumin, lactoglobulin and immunoglobulins.

3. The composition of matter as defined by claim 1, in powdered form.

4. The composition of matter as defined by claim 1, devoid of emulsifier and fatty component.

5. The composition of matter as defined by claim 1, further comprising an additional colloidal ingredient.

6. The composition of matter as defined by claim 5, said additional colloidal ingredient being vegetable seed gum, carob seed gum, guar gum, algae gum, an alginate agar-agar, a carragheenate, sodium, carboxymethylcellulose, pectin, or admixture thereof.

7. The composition of matter as defined by claim 1, further comprising a chemically unmodified starch.

8. The composition of matter as defined by claim 1, further comprising an edible phosphate.

9. The composition of matter as defined by claim 1, further comprising a sweetener.

10. The composition of matter as defined by claim 1, further comprising a foodgrade acid agent.

11. The composition of matter as defined by claim 1, further comprising a flavoring ingredient.

12. The composition of matter as defined by claim 1, further comprising a perfume or odorant.

13. The composition of matter as defined by claim 1, the ratio by weight of lactoserum proteins (i) and Xanthomonas hydrophilic colloid (ii) ranging from 5 to 15%.

14. The composition of matter as defined by claim 3, further comprising powdered whole or skim milk.

15. The composition of matter as defined by claim 5, said additional colloid being sodium alginate, a carragheenate, or mixture thereof.

16. The composition of matter as defined by claim 7, said chemically unmodified starch being a pregelatinized starch.

17. The composition of matter as defined by claim 8, said edible phosphate being tetrasodium or tetrapotassium pyrophosphate.

18. The composition of matter as defined by claim 9, said sweetener comprising sucrose.

19. The composition of matter as defined by claim 10, said acid agent comprising citric acid.

20. The composition of matter as defined by claim 11, said flavoring ingredient comprising cacao, vanilla, cinnamon, or fruit extract.

21. The composition of matter as defined by claim 1, comprising, by weight, 5 to 20% lactoserum proteins (i), 0.5 to 1.5% Xanthomonas hydrophilic colloid (ii), 0.5 to 1.5% of an additional colloidal ingredient, 5 to 20% of a chemically unmodified starch, and 0.5 to 1.5% of an edible phosphate.

22. The composition of matter as defined by claim 21, further comprising from 50 to 90% of a sweetener.

23. An instant dessert comprising the composition of matter as defined by claim 1.

24. An edible food substrate comprising the composition of matter as defined by any of claims 2, 3–13, or 1 whipped to predetermined volume with milk or water.

25. The edible food substrate as defined by claim 24, comprising a mousse.

26. The edible food substrate as defined by claim 24, in refrigerated or frozen state.

27. The composition of matter as defined by claim 1, said Xanthomonas hydrophilic colloid being obtained by fermentation of a carbohydrate with a culture of Xanthomonas Begoniae, Xanthomonas Campestris, Xanthomonas Carotea, Xanthomonas Hederae, Xanthomonas Incanae, Xanthomonas Malvacearum, Xanthomonas Phaseoli or Xanthomonas Vitians.

28. The composition of matter as defined by claim 1, said Xanthomonas hydrophilic colloid being obtained by fermentation of a carbohydrate with a pure culture of *Xanthomonas campestris*, followed by extraction with isopropanol, drying and grinding of the resultant colloid.

29. The composition of matter as defined by claim 1, comprising, by weight, 5 to 20% lactoserum proteins (i), 0.5 to 1.5% Xanthomonas hydrophilic colloid (ii), 5 to 20% chemically unmodified starch, 0.5 to 1.5% edible phosphate, and 50 to 90% sweetening agent.

* * * * *